United States Patent [19]

Kanter

[11] 3,778,765

[45] Dec. 11, 1973

[54] UNIVERSAL CHECK DIGIT VERIFIER/GENERATOR SYSTEMS

[75] Inventor: Michael Edward Kanter, Hitchin, England

[73] Assignee: International Computers Limited, London, England

[22] Filed: Feb. 14, 1972

[21] Appl. No.: 226,110

[30] Foreign Application Priority Data

Feb. 17, 1971 Great Britain .................... 4,803/71

[52] U.S. Cl. ........................................ 340/146.1 AJ
[51] Int. Cl. .......................... H03k 13/32, H041 1/10
[58] Field of Search ........................... 340/146.1 AJ; 235/61.7 A

[56] References Cited

UNITED STATES PATENTS

| | | | |
|---|---|---|---|
| 3,571,581 | 3/1971 | Kaus | 340/146.1 AJ |
| 3,526,875 | 9/1970 | Jourdan | 340/146.1 AJ |
| 3,484,744 | 12/1969 | Gertler et al. | 340/146.1 AJ |
| 3,384,902 | 5/1968 | Schroder et al. | 340/146.1 AJ |
| 3,235,716 | 2/1966 | Porter et al. | 340/146.1 AJ |

*Primary Examiner*—Charles E. Atkinson
*Assistant Examiner*—David H. Malzahn
*Attorney*—Hane, Baxley & Spiecens

[57] ABSTRACT

A check digit verifying/generating system is capable of operation in a simple verifying mode using a set of predetermined weighted values and modulus. An element of universal application is afforded by an extended mode of operation in which a selected one of a number of sets of weighting values and a selected modulus is provided for dealing with input signals.

5 Claims, 2 Drawing Figures

PATENTED DEC 11 1973 3,778,765

UNIVERSAL CHECK DIGIT VERIFIER/GENERATOR SYSTEMS

INTRODUCTION

The present invention relates to a universal check digit generator/verifier system.

In order for any particular data processing system to operate satisfactorily, incoming data must be prepared, or presented, to the system in a manner suitable for machine use. One common way to prepare such data is for an operator to enter the data on a punch card by means of a keyboard unit. By pressing a particular key, the operator will cause one or more holes to be punched in the card, with each arrangement of holes representing a character, e.g., the letter *a* or the numeral 2. It has been found that even skilled keyboard operators will make errors in preparing data, the errors being frequent enough that it is necessary to check data as it is prepared.

BACKGROUND TO THE INVENTION

One method to check that data is being correctly prepared by an operator is to calculate a check digit from a set of digits representing input data and to append the check digit to the particular set of digits. Then as the operator enters the set of digits on say a punch card, the check digit is recalculated and compared to the check digit already associated with the particular set of digits. If the two check digits are not equal, the system will signal that an error has occurred. Various ways of calculating check digits are well known to those skilled in the art. One simple technique is to divide the input data (set of digits) by a base number or modulus and to append the remainder of such division as a check digit. Then as the set of digits including the check digit is entered on say a punch card by a keyboard operator, the check digit is recalculated and compared with the check digit of the input data. If, however, digits of the input data are merely transposed for instance, the remainder will not be affected in all cases when the set of digits is divided by a particular modulus. In order to prevent this error from passing undetected, other methods of calculating check digits, which may involve weighting techniques, are used. However, these other methods of calculations will be susceptible to still further errors passing undetected. The particular method of calculating check digits, therefore, will generally depend on which type of errors the user is most determined to avoid as the time and expense required to eliminate virtually all errors approaches prohibitive amounts.

In various known types of equipment, check digits have been generated and verified by electromechanical devices such as multiplier relay matrices. As a result of such devices being produced by several manufacturers, different moduli and different weighting techniques have been adopted by individual users. For example, a modulus of 10 and a modulus 11 are both in common usage while one common formula for calculating check digits using different weights is:

$$\left|\sum_{i=1}^{k} w_i d_i\right|_N = c$$

where $c$ is the check digit; $k$ is the number of digits of the set of digits, or code number, $d_k \ldots d_1$, having weights $w_k \ldots w_1$ applied to the digits, and N is the modulus.

In view of the number of methods of calculating check digits a user may encounter certain difficulties in replacing old or obsolete equipment. For example, if a user employs a modulus of 13 and a particular weighting scheme for calculating check digits which may be appended say, to customer account code numbers, the user must have a check digit verifier/generator system which will operate on modulus 13 and that particular weighting scheme. Most manufacturers, however, find it simple and economical to produce systems that operate on the basis of a particular modulus and a predetermined weighting scheme. Thus, the range of new equipment available to a user is in effect, limited as the cost to a user in altering his system of code numbers, or recoding all frequently used data (customer accounts, etc.,) is generally prohibitive.

SUMMARY OF THE INVENTION

It is an object of the present invention to provide a check digit verifying/generating system in which the mode of operation, modulus number and weighting technique may be externally controlled to allow check digits to be calculated by any one of several different methods.

According to the present invention, a check digit verifying/generating system includes weighting means for producing a predetermined set of weighted values in response to an input signal for any one of a number of sets of weighted values in response to program input signals, means to produce a modulus number in response to modulus input signals, means to calculcate a check digit indicated as a function of a constant remainder, as a modulus N complement or a modulus N remainder and means to verify a check digit appended to incoming data signals.

INTRODUCTION TO THE DRAWINGS

Check digit verifying/generating apparatus embodying the present invention will now be described, by way of example, with reference to the accompanying drawing, in which, FIGS. 1 and 2 show diagrammatic circuit representations of two embodiments of universal check digit verifying/generating systems.

DESCRIPTION OF PREFERRED EMBODIMENTS

As a result of the development of low cost integrated circuit modules, it has been found economical, particularly with respect to data processing equipment, to carry out by hardware many operations previously done by programming. The embodiments to be described may be economically constructed by integrated circuit techniques which will supply the signals herein referred to as "program signals".

Figure 1:
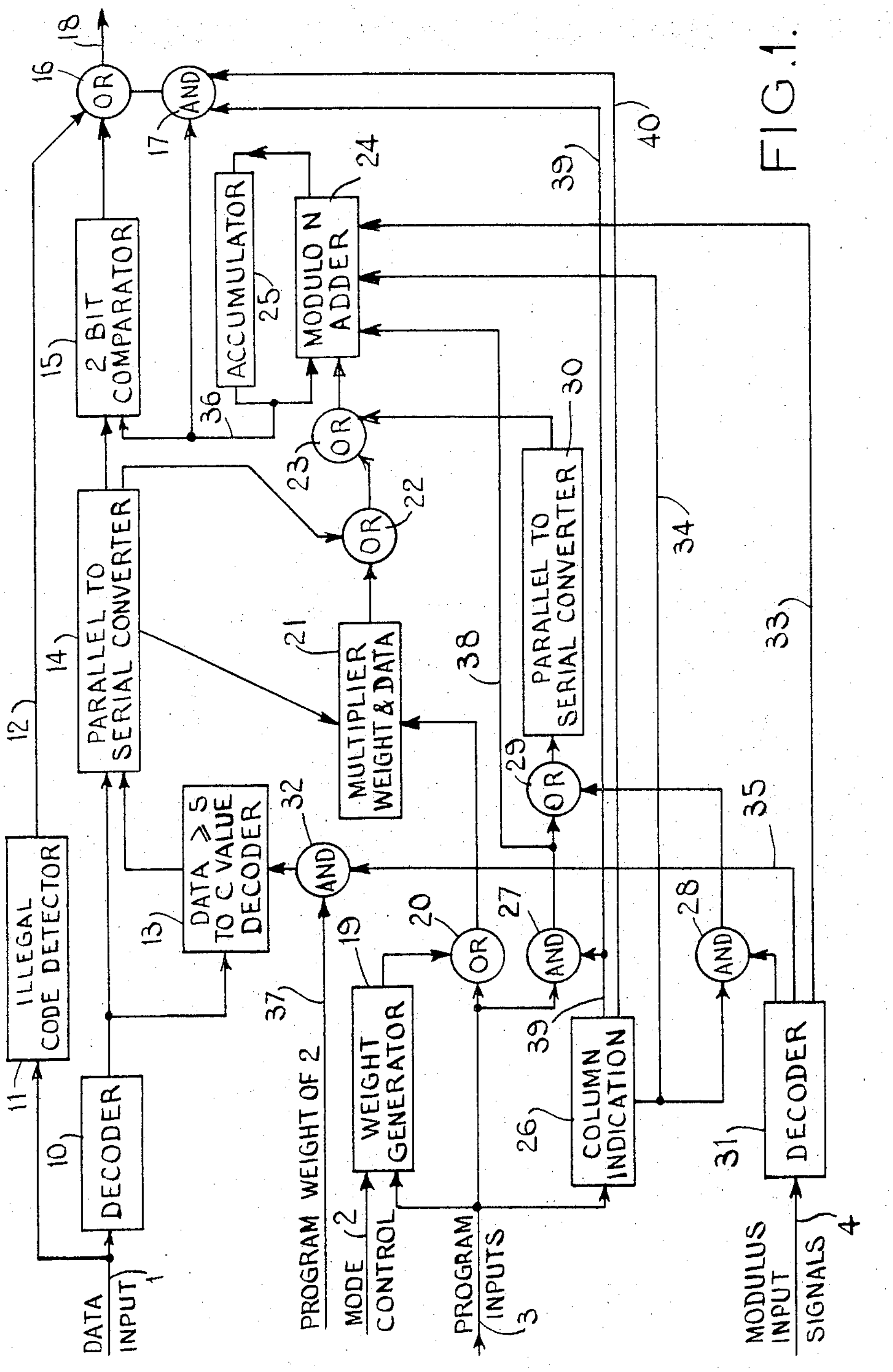

Referring now to FIG. 1, data input signals, which may be produced by a keyboard unit, are fed over line 1 to a decoder 10 which produces a binary output in parallel form. The data input signals are also supplied to an illegal code detector 11 which produces an output over line 12, and hence to output line 18 via OR gate 16, should the data input signals (digits) and associated check digit be in an illegal or forbidden combination. Suitable illegal code detectors 11 are known to those skilled in the art, so details are not given here.

The output of decoder 10 is applied to a parallel to serial converter 14 which transforms the binary data input to serial form and applies the same to one input of a 2 bit comparator 15. A calculated check digit is applied over line 36 as a second input to comparator 15 such that when the system is operated in a verify mode, an error indication is produced if an input check digit does not agree with the corresponding calculated check digit. It will be noted that by handling data (and program) signals in serial form, the number of separate channels required to generate or verify check digits is substantially reduced. Since the overall speed of the system is limited by the speed of the keyboard operator, data input and program input signals may be handled in serial fashion without any significant decrease in system efficiency.

Mode control signals are applied over line 2 to a weight generator 19 which will produce a set of weights for either a simple or extended mode of operation. A binary 1 signal over line 2 for example, will indicate a simple mode while a binary 0 will initiate the extended operating mode. Considering the operating modes further, a simple mode is contemplated in which check digits are only verified and in which a permanently wired modulus N, such as 11, is employed. A modulo N complement (N−C) may be calculated for verifying purposes by using that modulus and, in predetermined order, a series of weights, e.g., 2–7. Alternatively, in the simple mode, check digits may be calculated by using a modulus of 10 and a cross addition-alternate weighting technique (to be described subsequently). In the extended mode of operation, program input signals over line 3 determine the set of weights to be employed and the particular method of calculating a check digit. In this mode, the system may operate to either verify or generate check digits. The appropriate modulus is selected by a machine switch (not shown) and may be a modulus 10 for use in "cross-addition" check digit calculation techniques as noted with respect to the simple mode of system operation.

The modulus input signals applied over line 4 may represent 7, 9, 10, 11, 13, 27 or 37. A decoder 31 produces a binary equivalent of the modulus input signal and applies its output to AND gate 28 and, over line 35, to AND gate 32. The modulus input signals are also applied directly from the decoder 31 to modulo N adder 24 via line 33.

The output of weight generator 19 is connected through OR gate 20 to multiplier 21, which in turn is connected through OR gates 22 and 23 to modulo N adder 24. An accumulator 25 is connected to modulo N adder 24 with the output of accumulator 25 being connected to comparator 15, as discussed and also to AND gate 17 by means of line 36. The AND gate 17 is in turn connected to OR gate 16 which supplies output line 18.

A program input line 3 is connected to weight generator 19, OR gate 20, column indication device 26 and AND gate 27. Column indication device 26 is connected to AND gates 27 and 28 and, over line 34, to modulo N adder 24. The AND gates 27 and 28 are connected to parallel to serial converter 30 via OR gate 29 while the output of converter 30 is applied to OR gate 23 and then to modulo N adder 24.

The operation of the system in either a simple or extended mode is determined by the mode control signal applied over line 2 to weight generator 19. Considering the simple mode of operation, i.e. a binary 1 is applied over line 2, a modulus input signal, represent a decimal 11 is applied over line 4 to decoder 31. Referring to Table I below, in the simple mode, program input bits $2^3$, $2^4$ and $2^5$ are pre-wired to logic 0 while bits $2^2$, $2^1$, $2^0$ are used as field indicators in this mode, and are set (not shown) to 1, 1, 0 to represent the beginning and end of a check digit field. The program store (not shown) is examined and when this indication of 1, 1, 0 is found in a section or column of the program store, a recirculating counter is initiated and counts from, say 2 – 7. Upon reaching a count of 7, the counter skips to 2 and continues until the contents of another program store column are found to be 1, 1, 0. Thus, if this occurs before the counter reaches a count of 7 for the second time, then in this case, however, the field length must be between 7 and 13 digits. Hence, the final state of the recirculating counter will indicate the weight which is to be applied to the first digit of input data. Thus, as each digit is entered on line 1 from the keyboard, a weight generated by weight generator 19 is applied thereto, with a weight of 2 being applied to the least significant or last received data digit. The weights and digits are multiplied by multiplier 21 with the products being read serially therefrom to the modulo N adder 24 via OR gates 22 and 23.

It will be seen, therefore, that the columns of the program store are read out in turn, one column being read out for the entry of each input digit, and hence that the program store includes a separate column respectively to represent the format and control information for each successive digit of entered data.

TABLE I

| | | | | | | | | |
|---|---|---|---|---|---|---|---|---|
| | | | $2^5$ | 0 | This bit has control significance | | | |
| | | | $2^4$ | 0 | 0 | 0 | 1 | 1 |
| | | | $2^3$ | 0 | 0 | 1 | 0 | 1 |
| | | | Simple mode | | Extended mode (weights) | | | |
| $2^2$ | $2^1$ | $2^0$ | Col. / Row | 0 | | | | |
| 0 | 0 | 0 | 0 | Fill | 0 | 8 | 16 | 24 |
| 0 | 0 | 1 | 1 | | 1 | 9 | 17 | 25 |

In the extended mode of operation, none of the program inputs are pre-wired to logical 0 but are all subject to the requirements of the program and signals on the program input lines $2^4$ – $2^0$ will indicate the weights to be applied to each input digit, i.e., they are, respectively, the binary representations of these weights. However, the last program digit of each single column, i.e. the $2^5$ digit, has a "control significance" in that different operations will be controlled by the appearance of binary one in this digit position in a particular column of the program codes. For example, should $2^5$ be logical 1 in the first column of the check digit field, or the first program column in Table 1, a start code is called for. Similarly, if this digit in the fourth column is logical 1 or 0, a check digit will be calculated as a Mod, N complement or remainder, respectively. These particular digits in the second and third columns however will not affect the universal check digit verifier/-generator system. Thus, the $2^5$ digit may also be employed to indicate the last column of the check digit field. In addition, the $2^4$ digit in the last program column is used to indicate whether check digit generation or verification is required and is applied to AND gate 17 over line 40. Thus, for example, if the $2^4$ digit is a logical 1, check digit generation is required.

As stated previously, the present invention allows check digits to be calculated by any one of several different techniques such as modulus N remainder or modulus N complement. Since these techniques are conventional and well known in the art, further discussion is not believed to be necessary. Another such calculation may be of the 'constant remainder'type in which a check digit is included in the complete value (set of input digits). Thus, with respect to a particular modulus, all values having the same (constant) remainder are valid values. An example may be shown as follows:

using conventional weightings of alternately 1 and 2, with a least significant digit weighting of 1, then $$|2\ 9\ 5\ 7\ 3\ 1|_N = \text{c.r. (or constant remainder)}$$

where $N = 11$ (as the modulus), the check digit is the least significant digit and is 1 and the constant remainder is 4. All values, then with a constant remainder of 4 will be valid values. Of course, check digits may be provided for values such that the constant remainder is zero.

Returning to the drawing, the value of the constant remainder, e.g. 4, is applied as a program input over line 3 to AND gate 27. This value is indicated by the bits $2^0 - 2^3$ in the last column of the program and is passed by the AND gate 27 to converter 30 via OR gate 29 when an end of field indication is produced by column indication device 26 on line 39 to open the AND gate 27, which indication is also applied to AND gate 17. The constant remainder is also applied directly to the modulo N adder 24 over line 38 as a control signal to cause a check digit to be indicated as:

$$c.r. - \left| \sum_{i=1}^{k} (w_i d_i) \right|_N$$

where $k$ equals the number of digits in the code number.

In most calculations, such as modulo N remainder or modulo N complement, the constant remainder is zero. The column indication device 26 will, in response to the $2^5$ bit of say the fourth column of program inputs, provide an appropriate control signal. Thus, a logical 0 in the fourth column, $2^5$ bit, will condition line 34 and modulo adder 24 to calculate a check digit as a modulo N complement. Similarly, a logical 1 will cause column indication device 26 to apply a conditioning signal to AND gate 28, which in turn allows a decoded modulus (9, 11, 27 etc.,) to pass to converter 30 via OR gate 29. The modulus is then applied to modulo N adder 24 via OR gate 23 as well as being directly applied over line 33 to the adder 24. Thus, in response to the logical significance of a particular program input, column indication device 26 will determine which type of calculation is to be effected by the modulo N adder 24.

Check digits may be calculated, in either the simple or extended mode, by employing a special scheme for determining weighting values for any particular modulus. The modulus may be 10, for example with the digits of the weight times data products being cross-added 'modulo 10'. For this calculation, decoder 31 produces an output on line 35, in response to a modulus designated as "10*c*", to distinguish this calculation from say a sum of the products modulus 10 type. A program weight of 2 is applied over line 37 through AND gate 32 to decoder 13 upon coincidence with the modulus 10*c* signal on line 35. Alternate ones of a set of data input digits are multiplied by 2 (by a program weight of 2) and the sum decoded by decoder 13 if the input data digits are equal to or greater than 5. The decoded binary data is then converted to serial form by converter 14 and passed to modulo N adder 24 by OR gate 22 and 23. The reason for such decoding the product of the program weight times the digits equal to 5 or greater is that the binary of the product is not likely to be the same as the binary of the sum of the digits (crossadded) of the product. For example, if the digit to be multiplied by 2 is 5, the product (10) will have its digits (1 and 0) cross-added with the sum passed to modulo N adder 24. However, the sum of the cross-added digit, namely 1, will not have the same binary equivalent as the product (10). Therefore, the cross-added sum must be decoded by decoder 13 so that a binary equivalent of the sum is passed on to converter 14, etc., Thus, the input of the modulo N adder 24 will be taken from multiplier 21 if a weight of 1 is applied or if a weight of 2 is applied and the digit has a value less than 5. Decoder 13 may be a 16 bit read only memory which produces a cross-added sum in binary form in response to an input digit (5 or greater) being applied thereto in binary form. It is noted that since decimal 9 has the same binary equivalent as the cross-added sum of the product of 9 × 2, 1 + 8 = 9, a digit of 9 will not need to be decoded. An example of such a calculation is shown below:

| | | | | | |
|---|---|---|---|---|---|
| Code number | 5 | 6 | 8 | 4 | 7 |
| Weights | 2 | 1 | 2 | 1 | 2 |
| | 10 | 6 | 16 | 4 | 14 |

Cross add 1+0+6+1+6+4+1+4 = 23

Check digit as Mod. 10 complement $$|10 - 23|_{10} = 7$$

Self checking number is 5 6 8 4 7 7

The above calculations may also be given effect if all data digits to be multiplied by 2 are decoded to their cross add equivalents in a 32 bit read only memory and then added as normal. The modulo N adder 24 is used as normal with the inputs being taken alternatively from the decoder (read only memory) 13 and the data input lines as indicated by the program signals.

A check digit is produced on line 36 and applied to AND gate 17. Upon the coincidence of an "end of field" signal over line 39 and a control signal over line 40, the generated check digit is passed to output line 18 via OR gate 16. The control signal, as stated earlier may be considered to be a logical 1 appearing in the $2^4$ bit of the last column of the program.

Figure 2:
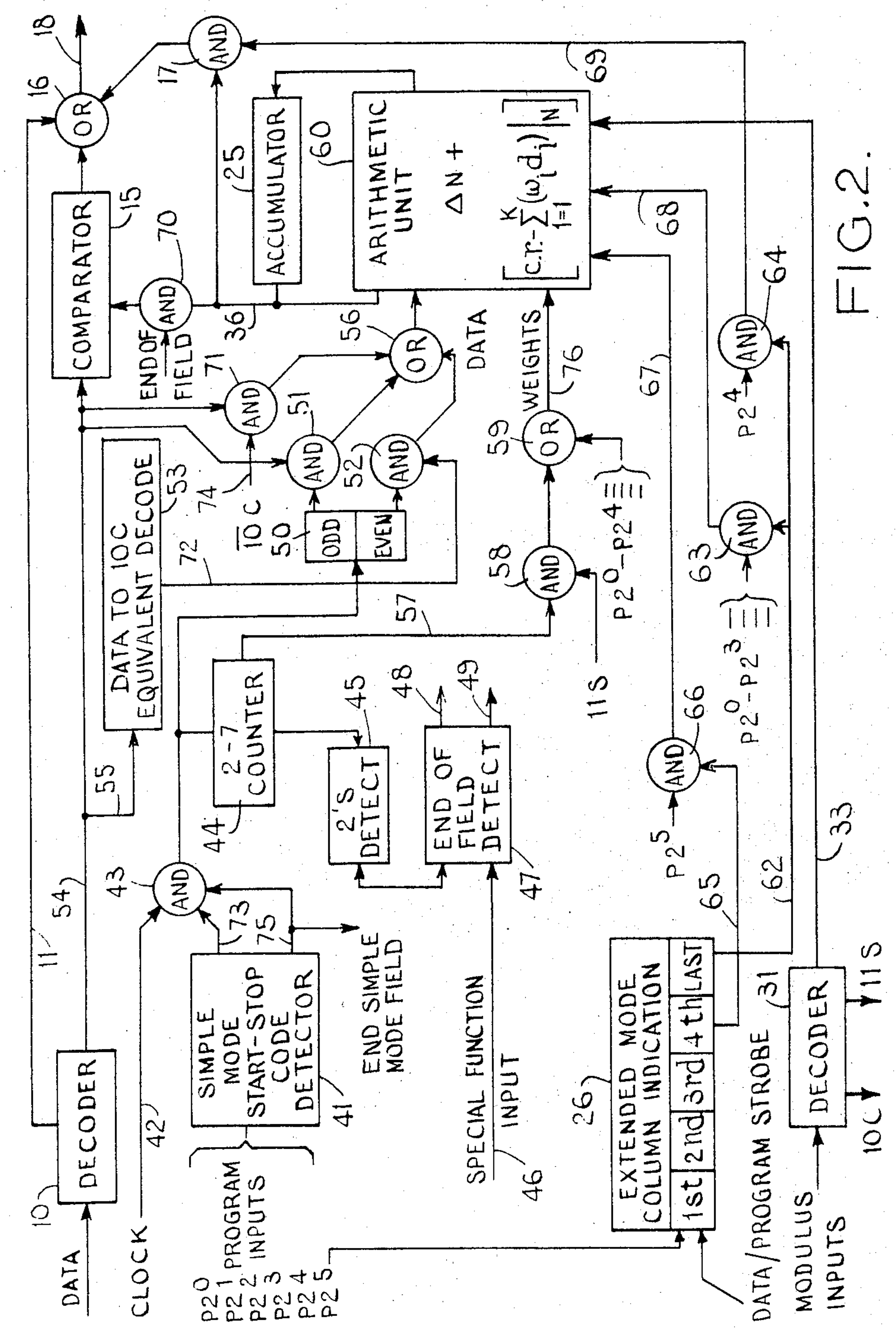

Referring to FIG. 2, there is shown a preferred embodiment of the present invention in which the requirements for mode control signals and 'program weight of 2' signals are eliminated. The system to be described, will as before, operate in either a simple or extended mode. It will be recalled that in a simple mode the system will only verify, while in an extended mode, verify/-generate operations will take place.

The mode of operation of the system shown in FIG. 2 is determined by the modulus input to decoder 31. A simple mode will be called for if a 10*c* or 11*s* signal is applied to the 3-bit decoder 31. By applying the other moduli used with FIG. 1 with the exception of 27, an extended mode of operation will be called for. In this manner, eight modulus inputs (two of which call for a simple mode) may be applied to decoder 31. Also, in a simple mode of operation, program inputs $p2^3 - p2^5$ will be wired to a logic 0 value.

The verification of check digits in modulus 10*c* form will now be described. Input data signals are decoded by decoder 10 and fed over line 55 to a decoder 53 which decodes the data into a 10*c* form. The operation of decoder 53 is similar to that of decoder 13 (FIG. 1) except that each incoming decoded data digit is multiplied by 2 and the digits of each product are cross-added. The cross-added sum is then decoded as before and is applied over line 72 to AND gate 52. A start code is provided by the three least significant program inputs and this code is detected by start-stop code detector 41 which in response thereto, provides an output over line 73 to AND gate 43. A clock signal on line 42 is then passed to an odd-even indicator 50 which alternately produces output signals to AND gates 51 and 52. Each odd clock pulse will allow a decoded digit to pass through AND gate 51 to arithmetic unit 60 while every even clock pulse will allow data decoded to a 10*c* equivalent to pass through AND gate 52 and OR gate 56 to arithmetic unit 60. An inverted modulus 10*c* signal will inhibit AND gate 71 from passing data directly from line 54 to arithmetic unit 60 during operation as modulus 10*c*. Detector 41 will provide an 'end°' signal on line 75 which allows the last digit which has been internally calculated by unit 60 to be passed over line 36 through AND gate 70 to comparator 15 for verification with the last incoming digit on line 54. Thus, in modulus 10*c* operation, no weights are applied to arithmetic unit 60 over line 76 while a modulus 10*c* input is applied over line 33 to unit 60.

Rather than controlling operations by clock signals on line 42, a strobe signal (applied to column indication device 26 may be employed to operate odd-even indicator 50 after indicator 50 has been 'primed' or set by a single clock signal on line 42.

In simple mode modulus 11*s* operation, a start code is detected by detector 41 which allows clock pulses on line 42 to be applied through AND gate 43. Clock pulses are applied to a counter 44 which produces weighting factors of 2, 3, 4, 5, 6 and 7 which recur cyclically and are applied to data digits in an ascending order beginning with the least significant data digit. Since the check digit field may have between 2 and 13 digits, it is necessary to know on what cycle of counter 44 the end of the field occurs. By setting a special function input signal on line 46 to binary 1, an end of field detecting unit 47 will indicate, in response to a 2's detecting circuit 45, whether the end of the field occurs after one complete counter cycle or not. Detector 47 may be a binary unit that conditions line 48 if, say the field is between 8 and 13 digits and line 49 if the field is between 2 and 7 digits. At the end of the check digit calculation, a signal on line 48 or 49 may be used to indicate the end of the check digit field and allow a verification operation to take place as before.

Weighting factors are applied serially by counter 44 over line 57 to AND gate 58 which is opened by a modulus 11*s* signal being applied as a second input thereto. Individual weights are then applied through OR gate 59 with corresponding data digits from line 54 (which are passed through AND gate 71) to arithmetic unit 60 where a check digit is calculated as modulo 11 complement.

In an extended mode of operating program inputs $p2^0 - p2^5$ associated with a check digit field will determine the operation to be effected, the weighting factors and the type of calculation to be carried out. The particular modulus to be employed will be applied as an input to decoder 31 and fed over line 33 to arithmetic unit 60. The numbers 10 or 11 may be used as a modulus number, N.

Each check digit field will consist of several columns of program inputs $p2^0 - p2^5$ and, while a field may have five columns, the number of columns is not limited to such a figure. A data/program strobe signal which is synchronous with clock input is applied to column indication device 26 and causes program inputs to be read on a column by column basis with corresponding data input signals. In the first column of program inputs, the $2^5$ bit will provide a start code signal, say binary 1, while the remaining bits $2^0 - 2^4$ designate a first weighting value. The $2^5$ bit of the fourth column will be applied to AND gate 66 as one input thereto while a signal indicating that the fourth column of program inputs is being read is applied as the other input. Depending whether the $2^5$ bit is a binary 1 or 0, the condition of line 67 will cause arithemetic unit 60 to calculate the check digit as a modulo N complement or modulo N, remainder. The weighting values which are sequentially applied to arithmetic unit 60 with corresponding data signals are determined by the program inputs $p2^0 - p2^4$ of each column. The weighting values are applied through OR gate 59 and over line 76 to arithmetic unit 60.

A signal indicating that the last column of program inputs is being read into the system is applied over line 62 to AND gates 63 and 64. Program inputs $p2^0 - p2^3$ of the last column are then applied through AND gate 63 and will define the value of the constant remainder applied to arithmetic unit 60. The program input $p2^4$ of the last column is applied as a second input to AND gate 64 and if this input is say a binary 1, line 69 will be conditioned and will open AND gate 17 to pass the calculated check digit on line 36 to the output line 18 via OR gate 16. If the program input $2^4$ is say a binary 0, AND gates 64 and 17 will remain closed and the calculated check digit will be verified. Finally, the program input $2^5$ will be used as a stop code when the last column is read.

The arithmetic unit 60 is arranged to calculate check digits from a generalised expression shown in FIG. 2. The specific calculation to be performed is controlled by signals applied over lines 33, 67 and 68. It will be realised that any arrangement of arithmetic circuits may be employed to calculate the generalised expresison shown. The term will be 1 if the following term (in brackets) is negative such that the calculated check digit is always a positive number. Also, a special reset signal (not shown) may be provided to reset arithmetic unit 60 upon the occurrence of an error during verification.

Also, it will be appreciated that arithmetic unit 60, decoders and logic elements may be provided in the form of integrated circuits. Decoders 10, 31 1nd 53 may for example, be read only memory devices as has been described with respect to FIG. 1.

In summary, the present invention includes a universal check digit verifier/generator capable of operation in either a simple or extended mode. Check digits may be indicated as one of a plurality of modulo and may be calculated from any of a plurality of weighting value schemes by any one of several calculation techniques. While all data, moduli and weighting factors have been expressed in binary coded decimal form for use in conventional *b.c.d.* multipliers and dividers, other means may be employed for arithmetic operations.

I claim:

1. Variable check digit calculating apparatus for calculating check digits according to programmed criteria including single adding means; a recirculating accumulator connected to said adding means; means responsive to a first program input to condition the adding means to operate in a selected modulus; weighting means responsive to a second program input and to input digit signals for applying a weighting factor to each input digit to produce a resultant product; means connecting said weighting means to said adding means to pass the resultant products for a series of digits sequentially to be added according to the selected modulus and means for deriving a check digit from the accumulator.

2. Apparatus as claimed in claim 1 including comparing means responsive to the check digit derived from the accumulator and to an input check digit effective to produce an error signal if the check digits applied to the comparing means do not agree.

3. Apparatus as claimed in claim 2 including column indicating means responsive to a third program input to indicate the occurrence of a final column of the input digits; an output line; and gating means responsive to the occurrence of said final column indication to permit said derived check digit to pass to said output line.

4. Apparatus as claimed in claim 3 in which the program inputs are applied column by column each in correspondence with input signals representing respectively different ones of successive input digits.

5. Apparatus as claimed in claim 3 in which each column of the program inputs corresponds to a digit representing column of a value field and in which said final column indication is produced for the final column of the value field corresponding to the position in the field arranged to contain the check digit.

* * * * *